Dec. 13, 1955      D. G. HOLLOWAY      2,727,210

MODULATORS FOR ELECTRIC OSCILLATIONS

Filed Nov. 24, 1952

*INVENTOR*
Dennis G. Holloway
By Ralph B. Stewart
Attorney

United States Patent Office 2,727,210
Patented Dec. 13, 1955

2,727,210

MODULATORS FOR ELECTRIC OSCILLATIONS

Dennis Godson Holloway, Taplow, England, assignor to British Telecommunications Research Limited, Taplow, England, a research organization incorporated in accordance with British law Application November 24, 1952, Serial No. 322,262

Claims priority, application Great Britain November 27, 1951

4 Claims. (Cl. 332—24)

The present invention relates to modulators for electric oscillations and is concerned to provide an improved modulator of simple construction for producing phase-modulated oscillations.

According to the present invention a modulator for electric oscillations comprises a modified balanced modulator of the rectifier type, the modification comprising the connection of two reactance elements of opposite sign in the modulator in such a manner that the modulator is unbalanced at the carrier frequency and provides, in addition to the two side-bands, an oscillation at the carrier frequency in phase-quadrature with the resultant of the two side-bands, and independent of the modulating voltage applied to the modulator.

Figure 1:
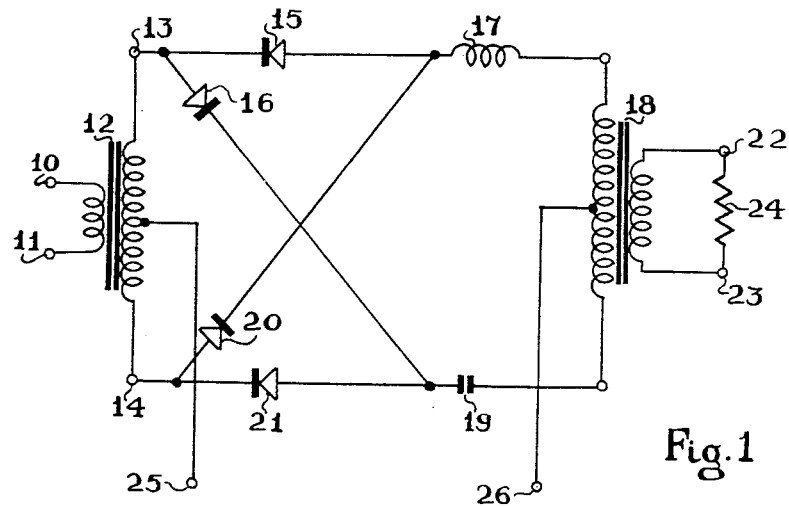
Figure 2:
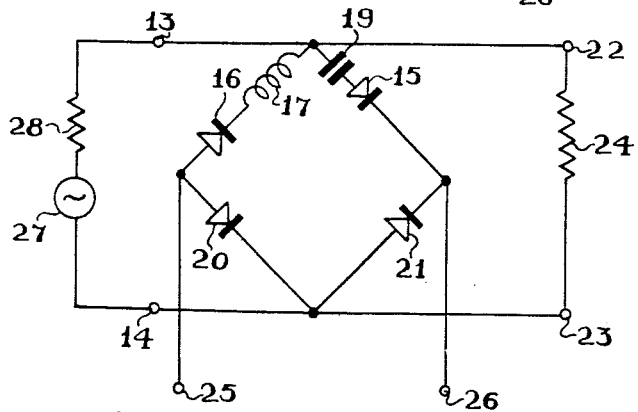
Figure 3:
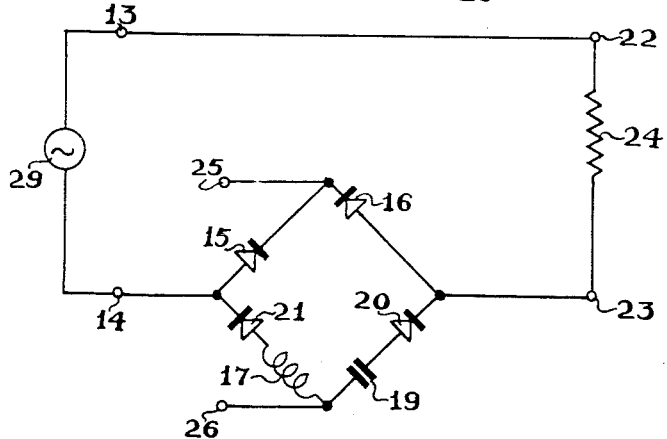

The invention will now be described by way of example with reference to the accompanying drawing, in which Figures 1, 2 and 3 are theoretical circuit diagrams of the three embodiments respectively of the invention.

Referring to Figure 1, modulating voltage is applied between two input terminals 10 and 11 which are connected through a transformer 12 to two terminals 13 and 14. The terminal 13 is connected to the cathode of a copper oxide rectifier 15 and to the anode of a copper oxide rectifier 16. The anode of the rectifier 15 is connected through an inductor 17 to one end of the primary winding of a further transformer 18 and the cathode of the rectifier 16 is connected through a capacitor 19 to the other end of the primary winding of the transformer 18. The terminal 14 is connected to the anode of a rectifier whose cathode is connected to the junction of the rectifier 15 with the inductor 17. The terminal 14 is also connected to the cathode of a rectifier 21 whose anode is connected to the junction of the rectifier 16 with the capacitor 19. The output terminals 22 and 23 of the secondary winding of the transformer 18 are connected to the load indicated by a resistor 24. The carrier is applied between two terminals 25 and 26 which are connected to centre taps on the secondary winding of the transformer 12 and the primary winding of the transformer 18 respectively.

It will be appreciated that with the inductor 17 and capacitor 19 short-circuited the arrangement of Figure 1 is a conventional balanced modulator of the rectifier type. It can be shown that the addition of the inductor 17 and the capacitor 19 unbalance the modulator at the carrier frequency and produce in the load 24 the two side-bands of the carrier together with an oscillation of the carrier frequency in phase quadrature with the resultant of the two side-bands and having an amplitude which is independent of the modulating voltage.

As is well known the combination of a carrier of such phase with the side-bands produces an oscillation of the carrier frequency which is phase-modulated by the modulating voltage. Thus the arrangement of Figure 1 provides a simple and cheap phase-modulator.

In Figure 2 the source of modulating voltage is shown as a generator 27 having high internal resistance 28 and may for example be provided by a pentode output stage of an amplifier. The terminal 13 is connected through the inductor 17 to the cathode of the rectifier 16 whose anode is connected to the terminal 25. The terminal 13 is in addition connected through the capacitor 19 to the anode of the rectifier 15 whose cathode is connected to the terminal 26. The terminal 14 is connected to the cathode of the rectifier 20 whose anode is connected to the terminal 25. Terminal 14 is also connected to the anode of the rectifier 21 whose cathode is connected to the terminal 26. The output terminals 22 and 23 are in this embodiment connected direct to the terminals 13 and 14 respectively and the load 24 is connected between the terminals 22 and 23.

It will be appreciated that if the inductor 17 and the capacitor 19 in Figure 2 are short-circuited the arrangement of Figure 2 would function as a further known balanced-modulator of the rectifier type. As in the arrangement of Figure 1 it can be shown that the arrangement of Figure 2 provides, in addition to the two side-bands, an oscillation of carrier frequency in phase quadrature with the resultant of the two side-bands whereby phase-modulation is effected.

Referring now to Figure 3 the source of modulating voltage is shown as a generator 29 of low internal resistance. The terminal 14 is in this embodiment connected to the anode of the rectifier 15 and to the cathode of the rectifier 21. The cathode of the rectifier 15 is connected to the terminal 25 and the anode of the rectifier 21 is connected through the inductor 17 to the terminal 26. The terminal 25 is also connected to the cathode of the rectifier 16 whose anode is connected to the output terminal 23. The terminal 26 is also connected through the capacitor 19 to the anode of the rectifier 20 whose cathode is connected to the terminal 23. The load 24 is connected between the terminals 22 and 23 as before.

As in the case of Figures 2 and 3 it can be shown that the output in the load 24 comprises an oscillation of the carrier frequency phase-modulated by the modulating voltage.

It will again be appreciated that if the inductor 17 and capacitor 19 of Figure 3 are short-circuited the modulator is then a conventional balanced-modulator of the rectifier type.

A description of the three known modulators of which the arrangements of Figures 1 to 3 respectively are modifications will be found on pages 552 and 553 of "Radio Engineers Handbook" by F. E. Terman published by McGraw-Hill Book Company Inc. New York and London 1943.

I claim:

1. A phase modulator comprising a source of carrier oscillations, an output circuit, a bridge network of non-linear impedance elements providing two opposing paths from the said source to the said output circuit, means including a source of modulating voltage connected to said bridge network to vary the impedance of said paths differentially, an inductive reactance element connected in one of said opposing paths, and a capacitive reactance element connected in the other of said paths.

2. A modulator according to claim 1, comprising two input terminals having an impedance element connected therebetween, two output terminals having an impedance element connected therebetween, two rectifiers connected in series between the two input terminals and poled in the same sense, two further rectifiers connected in series between the two input terminals and poled in the opposite sense to the first said rectifiers, a first connection from the junction of the first said two rectifiers to one of the output terminals, a second connection between the junction of the other two rectifiers to the other output terminal and two carrier voltage terminals connected to taps on the said impedance elements respectively, and the said two reactance elements are connected in the said first and second connections respectively extending between the junctions of the said rectifiers and the output terminals.

3. A modulator according to claim 1, comprising two modulating voltage input terminals connected to two output terminals respectively, a first pair of rectifiers connected in series between the two input terminals and being oppositely poled, a second pair of rectifiers connected in series between the input terminals and being oppositely poled, and the rectifiers connected to the same input terminal being oppositely poled, and connections for applying the carrier oscillation between the junction of the rectifiers in the first pair and the junction of the rectifiers in the second pair, and the said reactance elements being connected in series with the two pairs respectively, one of the reactance elements being connected in the circuit between one of the carrier voltage input terminals and one of the ouput terminals and the other reactance element being connected in the circuit between the other carrier voltage input terminal and the said one of the output terminals.

4. A modulator according to claim 1, comprising a first modulating voltage input terminal connected to a first output terminal, second modulating voltage input terminal connected through an arrangement of rectifiers to the second output terminal, the arrangement of rectifiers comprising two rectifiers connected in series between the second modulating voltage input terminal and two carrier voltage input terminals respectively, and two further rectifiers connected between the carrier voltage input terminals respectively and the second output terminal, the rectifiers being poled in senses such that proceeding from one of the carrier voltage input terminals through the two rectifiers connected thereto the rectifiers are poled in like sense, and proceeding from the other carrier voltage input terminal through the two rectifiers connected thereto the two rectifiers are poled in like sense but opposite to the first said sense, and the said two reactance elements are connected in series with the two circuits connecting one of the carrier voltage input terminals to the second input and second output terminals respectively.

References Cited in the file of this patent
UNITED STATES PATENTS

| | | |
|---|---|---|
| 2,524,992 | Rodhe | Oct. 10, 1950 |
| 2,608,650 | Myers | Aug. 26, 1952 |